(12) United States Patent
Kato

(10) Patent No.: US 7,114,284 B2
(45) Date of Patent: Oct. 3, 2006

(54) JOINT TYPE MINNOW

(75) Inventor: Masao Kato, Shizuoka (JP)

(73) Assignee: Jackson Inc., Shizuoka (JP)

( * ) Notice: Subject to any disclaimer, the term of this patent is extended or adjusted under 35 U.S.C. 154(b) by 0 days.

(21) Appl. No.: 10/991,383

(22) Filed: Nov. 19, 2004

(65) Prior Publication Data
US 2005/0102884 A1    May 19, 2005

(30) Foreign Application Priority Data
Nov. 19, 2003  (JP) ............................. 2003-389073

(51) Int. Cl.
*A01K 85/00*     (2006.01)
(52) U.S. Cl. .................. 43/42.15; 43/42.03; 43/42.04; 43/42.31
(58) Field of Classification Search ............... 43/42.15, 43/42.16, 42.02, 42.03, 42.11, 42.31, 42.04
See application file for complete search history.

(56) References Cited

U.S. PATENT DOCUMENTS

| 2,910,799 | A | * | 11/1959 | Wentworth | 43/42.02 |
|---|---|---|---|---|---|
| 3,942,280 | A | * | 3/1976 | Ryder et al. | 43/42.15 |
| 4,573,282 | A | * | 3/1986 | Rowe | 43/42.15 |
| 4,873,782 | A | * | 10/1989 | Gudermuth, Jr. | 43/42.15 |
| 5,406,738 | A | * | 4/1995 | Holleman, Sr. | 43/42.15 |
| 5,829,183 | A | * | 11/1998 | Guerin | 43/42.35 |
| 6,453,599 | B1 | * | 9/2002 | Mathews et al. | 43/42.31 |
| 6,546,663 | B1 | * | 4/2003 | Signitzer et al. | 43/4.5 |
| 6,671,996 | B1 | * | 1/2004 | Ito | 43/42.31 |

FOREIGN PATENT DOCUMENTS

JP    8-298897    11/1996

* cited by examiner

*Primary Examiner*—Teri Pham Luu
*Assistant Examiner*—Joshua Michener
(74) *Attorney, Agent, or Firm*—Oblon, Spivak, McClelland, Maier & Neustadt, P.C.

(57) ABSTRACT

A joint type minnow having a body which is formed so as to imitate a bait fish and divided into a main body portion and a tail portion so that the main body portion and the tail portion are mutually swingably joined to each other through a latch structure, is further equipped with a structure for regulating the mutual swing motion between the main body portion and the tail portion. The structure regulates the swing motion of the tail portion at a casting time to reduce air resistance, thereby avoiding reduction in flight distance of the lure.

11 Claims, 5 Drawing Sheets

(a)

(b)

JOINT TYPE MINNOW

BACKGROUND OF THE INVENTION

1. Field of the Invention

The present invention relates to a lure for fishing, and particularly to a joint type minnow which can overcome various disadvantages of conventional joint type minnows, for example, a disadvantage that a joint portion or a hook is tangled with a line, a disadvantage that a casting distance is short, etc.

2. Description of the Related Art

As one kind of lures supplied for bass fishing is known a so-called minnow which is formed by imitating the shape of a bait fish. Such a minnow is used while imitating motions of a bait fish such as wobbling, rolling or the like in water by drawing a line connected to a line eye equipped to the head portion of a body which mainly imitates a fish body.

There is further known a so-called joint type minnow in which a body 1' shown in FIG. 5 is divided into a main body portion 1A' and a tail portion 1B' and they are swingably joined to each other in order to make the motion of such a lure as described above more similar to the motion of an actual fish. In such a type of lure, the body 1' is waggled or inclined by water flow acting on a lip 2' equipped in the vicinity of the head portion or the like. At this time, the joint portion 10' is bent and waggles, and thus the body makes a motion similar to the motion of a true bait fish (for example, see JP-A-8-298897 (FIG. 1)).

However, the joint type minnow M' has structurally the following problem. That is, when the joint type minnow M' is cast, the tail portion 1B' is bent in air and thus air resistance increases as shown in FIG. 5(*a*), which causes reduction in casting distance. Furthermore, particularly when an angler enters a casting operation, the joint type minnow M' is suspended through a line L. At this time, the tail portion 1B' is unstably swung, and thus a hook 5' or a joint portion 10' equipped to the tail portion 1B' is easily tangled with the line L as shown in FIG. 5(*b*). Particularly when the joint portion 10' is tangled with the line L, it needs a lot of labor to disentangle the line L. Accordingly, the conventional joint type minnow M' is unsuitable for use under a strong wind condition or against wind condition.

SUMMARY OF THE INVENTION

The present invention has been implemented in view of the foregoing situation, and has an object to provide a novel joint type minnow in which mutual swing motions of a main body portion and a tail portion are regulated at a casting time, and the regulation of the mutual swing motions between the main body portion and the tail portion is released in water, so that a swim action inherent to a joint type minnow can be implemented in water.

In order to attain the above object, according to a first aspect of the present invention, there is provided a joint type minnow having a body portion which is formed so as to imitate a bait fish and divided into a main body portion and a tail portion, wherein the main body portion and the tail portion are mutually swingably joined to each other by a latch structure, and the joint type minnow is further equipped with a structure for regulating the swing motion of the main body portion and the tail portion.

According to this invention, when casting is carried out, the swing motion of the tail portion is regulated to reduce air resistance, whereby reduction in casting distance can be avoided.

According to a second aspect of the present invention, in the joint type minnow described above, the regulation of the swing motion of the main body portion and the tail portion is carried out at a casting time, and also released at a retrieving time.

According to the present invention, the swing motion of the tail portion is regulated to thereby reduce air resistance at the casting time, and the regulation is released in water so that the joint type minnow takes a swim action inherent thereto in water.

Furthermore, according to a third aspect of the present invention, in the joint type minnow described above, the structure for regulating the swing motion of the main body portion and the tail portion comprises a stick accommodating portion formed in each of both the main body portion and the tail portion, and a fixing stick which is movably accommodated in at least one of the stick accommodating portions of the main body portion and the tail portion.

According to the present invention, the fixing stick is movable by its own weight, so that the regulation of the swing motion and the release of the regulation can be performed without carrying out any special operation. Therefore, the fixing stick can be located in the stick accommodating portion formed in the tail portion to regulate the swing motion of the tail portion at the time point when an angler takes a casting position and a lure falls into an erected state. When the angler starts retrieval and the lure is set in a frontward inclined position, the fixing stick can be located in the stick accommodating portion formed in the main body portion, and thus the regulation of the swing motion can be released.

Furthermore, according to a fourth aspect of the present invention, in the joint type minnow described above, the stick accommodating portion formed in the main body portion is formed in such depth that the whole fixing stick can be accommodated in the stick accommodating portion, the stick accommodating portion formed in the tail portion is formed in such depth that only a part of the fixing stick portion can be accommodated in the stick accommodating portion, and when the fixing stick is accommodated in the stick accommodating portion formed in the tail portion, the fixing stick is also accommodated in the stick accommodating portion formed in the main body portion.

According to the present invention, the swing motion can be surely regulated under the state that the fixing stick is received in the stick accommodating portion formed in the tail portion, and also the regulation of the swing motion can be also surely released under the state that the fixing stick is received in the stick accommodating portion formed in the main body portion.

Furthermore, according to a fifth aspect of the present invention, in the joint type minnow described above, an end face at the joint portion side of the tail portion has a V-shaped slant surface, and the stick accommodating portion is formed at the bottom portion of the slant surface.

According to the present invention, the fixing stick can be surely located in the stick accommodating portion formed in the tail portion while the lure (minnow) is erected with the main body portion thereof placed face up.

The above object can be achieved by using the constituent elements of each aspect of the present invention described above.

According to the present invention, the mutual swing motion between the main body portion and the tail portion is regulated at the casting time, and the regulation of the swing motion is released at the retrieving time, whereby the swim action inherent to the joint type can be implemented.

Furthermore, an angler can implement the regulation of the swing motion and the release of the regulation as described above during a series of operations from casting to retrieval without paying special attention thereto.

DETAILED DESCRIPTION OF THE PREFERRED EMBODIMENTS

Figure 1:
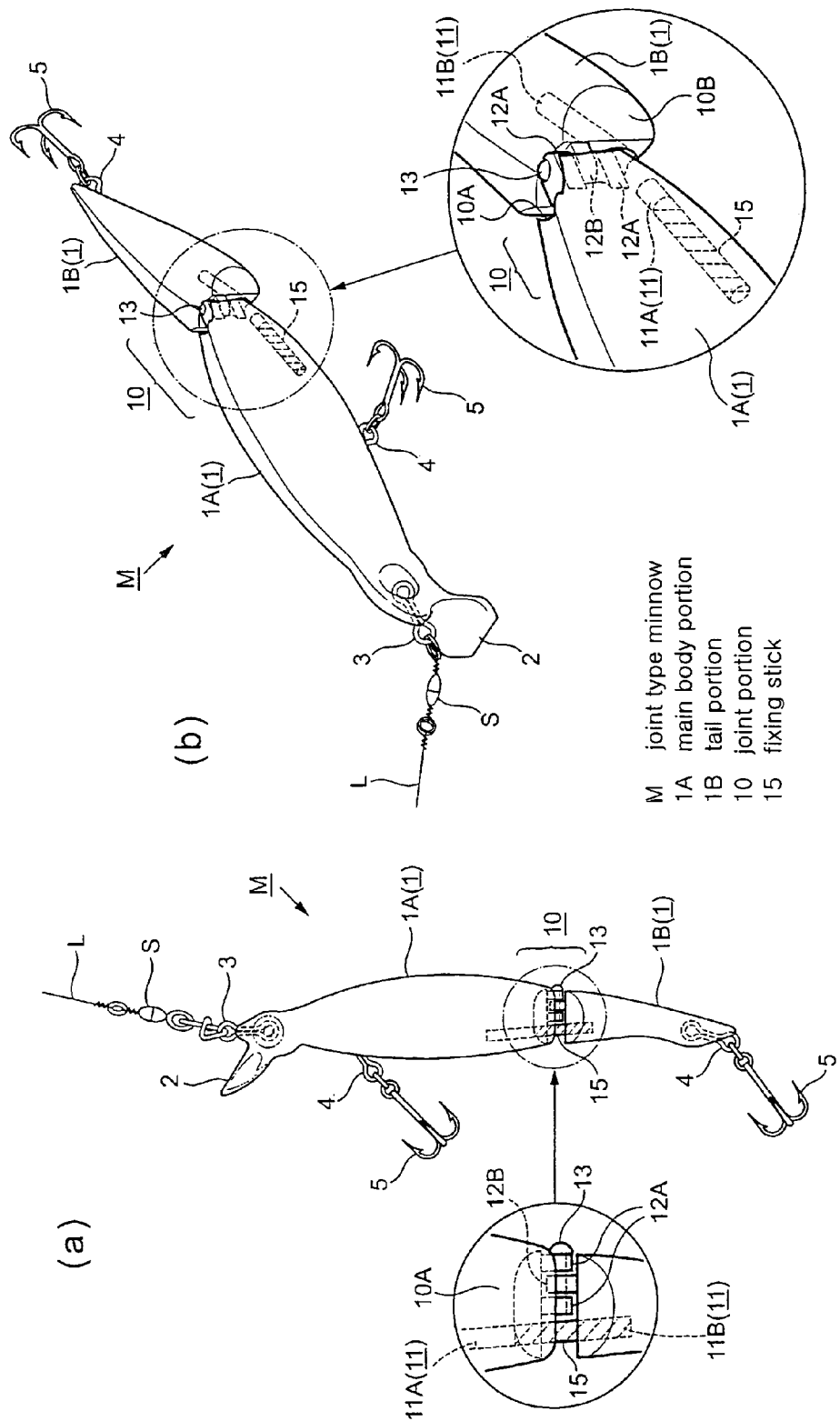
FIGS. 1(a) and 1(b) are side view and perspective view showing a joint type minnow according to the present invention.
Figure 2:
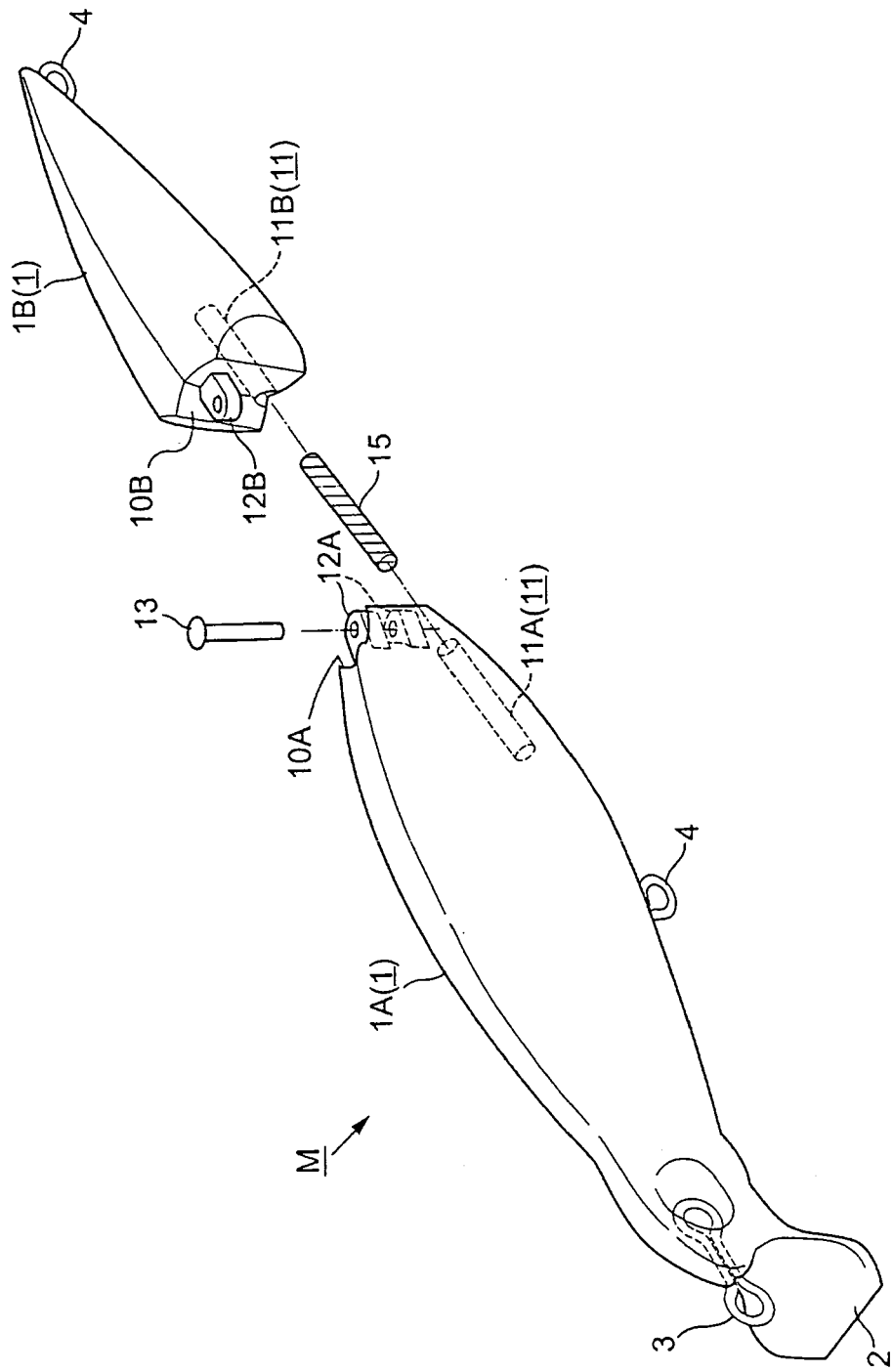
FIG. 2 is an exploded perspective view showing the joint type minnow shown in FIGS. 1(a) and 1(b)

A preferred embodiment according to the present invention will be described hereunder with reference to the accompanying drawings. In the following description, the present invention will be described by using a preferred embodiment of a joint type minnow. However, the present invention is not limited to the following embodiment, and various technical modifications may be made to the embodiment without departing from the subject matter of the present invention.

In the figures, reference character M represents a joint type minnow of the present invention, and this is a lure having a body portion 1 which is formed so as to imitate a bait fish and divided into a main body portion 1A and a tail portion 1B so as to be mutually swingably joined to each other.

A flat-plate type lip 2 is equipped in the neighborhood of a lower jaw of a head portion of the main body portion 1A, and further an annular line eye 3 is equipped to the front side of the head portion. An annular hook eye 4 is equipped at a proper place in the neighborhood of a pectoral fin, abdominal fins or an anal fin in the main body portion 1A. Furthermore, an annular hook eye 4 is also equipped at the backmost portion of the tail portion 1B, and a hook 5 is connected to each of the hook eyes 4.

For example, the body 1 is formed by adhesively attaching symmetrical pieces formed of resin, and the surface thereof is subjected to coloring while imitating a bait fish for a target fish.

A structure for regulating the mutual swing motion of the main body portion 1A and the tail portion 1B is equipped in the neighborhood of the joint portion 10 of the main body portion 1A and the tail portion 1B. This structure will be described in detail below.

First, stick accommodating portions 11A and 11B are formed in the main body portion 1A and the tail portion 1B respectively, and in this embodiment they are formed by embedding cylindrical members at the end faces 10A and 10B of the main body portion 1A and the tail portion 1B. The stick accommodating portion 11A of the main body portion 1A is formed so as to be so long (deep) that the entire length of a fixing stick 15 described later can be accommodated therein. Furthermore, the stick accommodating portion 11B of the tail portion 1B is formed to have about a one-third length of the fixing stick 15. The fixing stick 15 comprises a rod-shaped member formed of iron, lead or the like, for example. The end faces 10A and 10B are equipped with latch receiving holes 12A and 12B, and a latch pin 13 is inserted in the latch receiving holes 12A and 12B and properly caulked or the like so as to be prevented from falling off, whereby the main body portion 1A and the tail portion 1B are joined to each other so as to be mutually swingable. When the main body portion 1A and the tail portion 1B are joined to each other as described above, the fixing stick 15 is inserted in the stick accommodating portion 11A of the main body portion 1A in advance.

The construction that the main body portion 1A and the tail portion 1B are mutually swingably joined to each other by the latch structure contains not only the construction using the latch receiving holes 12A and 12B and the latch pin 13, but also a construction of fixing a pair of vertically crossed rings to the end faces 10A and 10B, etc.

The structure of regulating the swing motion of the main body portion 1A and the tail portion 1B is formed as described above. The fixing stick 15 which is set to be inserted in the stick accommodating portion 11B under the state that the body 1 is erected with the head portion thereof placed face up partially projects from the stick accommodating portion 11B as shown in FIG. 3(a), and the projection end of the fixing stick 15 is also set to be inserted in the stick accommodating portion 11A, whereby the mutual swing motion of the main body portion 1A and the tail portion 1B is regulated.

Figure 3:
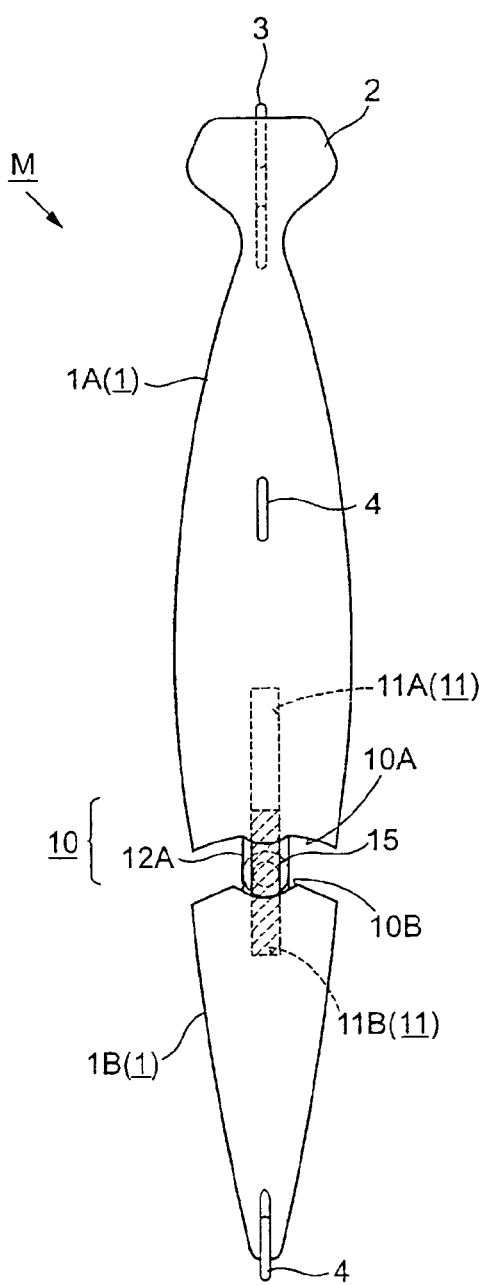
FIGS. 3(a) and 3(b) are bottom views of the joint type minnow shown in FIGS. 1(a) and 1(b)
Figure 3:
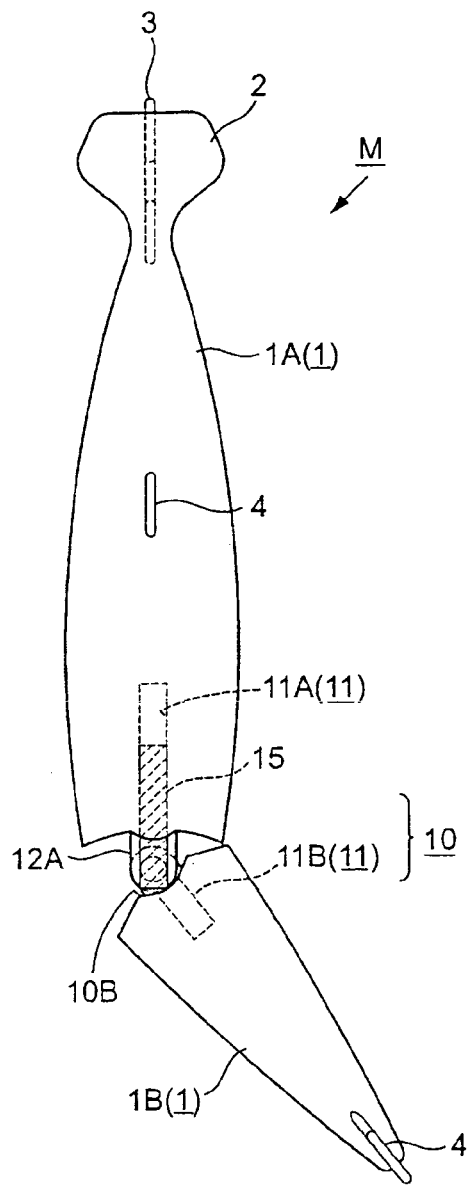

Furthermore, in this embodiment, the end face 10B at the joint portion side of the tail portion 1B is formed obliquely so that a V-shaped valley portion in bottom view is formed as shown in FIGS. 3(a) and 3(b). The stick accommodating portion 11B is formed in the bottom portion between the slant surfaces. The end face 10A of the main body portion 1A is also obliquely so that the stick accommodating portion 11A is formed at the apex portion between the slant surfaces. Here, the V-shape is not limited to a shape in which the confronting slant surfaces intersect to each other at an acute angle, but also a shape in which the confronting slant surfaces intersect to each other at an obtuse angle, a shape in which the apex portion is gently curved, etc.

The swing range of the tail portion 1B is restricted so that the fixing stick 15 does not fall off the stick accommodating portion 11A as shown in FIG. 3(b).

Furthermore, in this embodiment, the body 1 is formed by resin molding, however, it may be formed of balsa. In this case, the stick accommodating portions 11A and 11B can be formed by drilling the end faces 10A and 10B to form holes therein and embedding metal pipes or the like in the holes or the like.

The joint type minnow M of the present invention is constructed as described above, and supplied to lure fishing as described below. The state of the joint type minnow M which varies in accordance with a series of operations carried out by an angler will be described.

[State before Casting]

First, the angler carries out an operation for casting the joint type minnow M to a desired point, that is, the angler manipulates a rod and a reel (not shown) to suspend the joint type minnow M through a line L (erected state) as shown in FIG. 1(a). The line L and the line eye 3 are connected to each other through a swivel S. At this time, as shown in FIG. 3(a), the fixing stick 15 moves downwardly by its own weight, and it is accommodated in the stick accommodating portion 11B formed in the tail portion 1B and also in the stick accommodating portion 11A formed in the main body portion 1A, so that the mutual swing motion between the main body portion 1A and the tail portion 1B is regulated.

Furthermore, when the joint type minnow M is set to be suspended by the line L (i.e., the erected state), even if the fixing stick 15 falls off the stick accommodating portion 11B, that is, even if the main body portion 1A and the tail portion 1B are relatively bent, the tail portion 1B is set to be vertically erected by its own weight, and thus the fixing stick 15 is guided to the stick accommodating portion 11B along the slant surfaces of the end face 10B and accommodated therein.

As described above, with respect to the joint type minnow M of the present invention, an angler enters a casting position and suspend the joint type minnow M by the line L (erected state) as in the case of the prior art, whereby the fixing stick 15 can be located in the stick accommodating portion 11B formed in the tail portion 1B and thus the mutual swing motion between the main body portion 1A and the tail portion 1B can be regulated without requiring any special operation. Therefore, it can be avoided that the joint portion 10 or the hook 5 is carelessly tangled with the line L at the casting time.

[State in Air]

Figure 4:
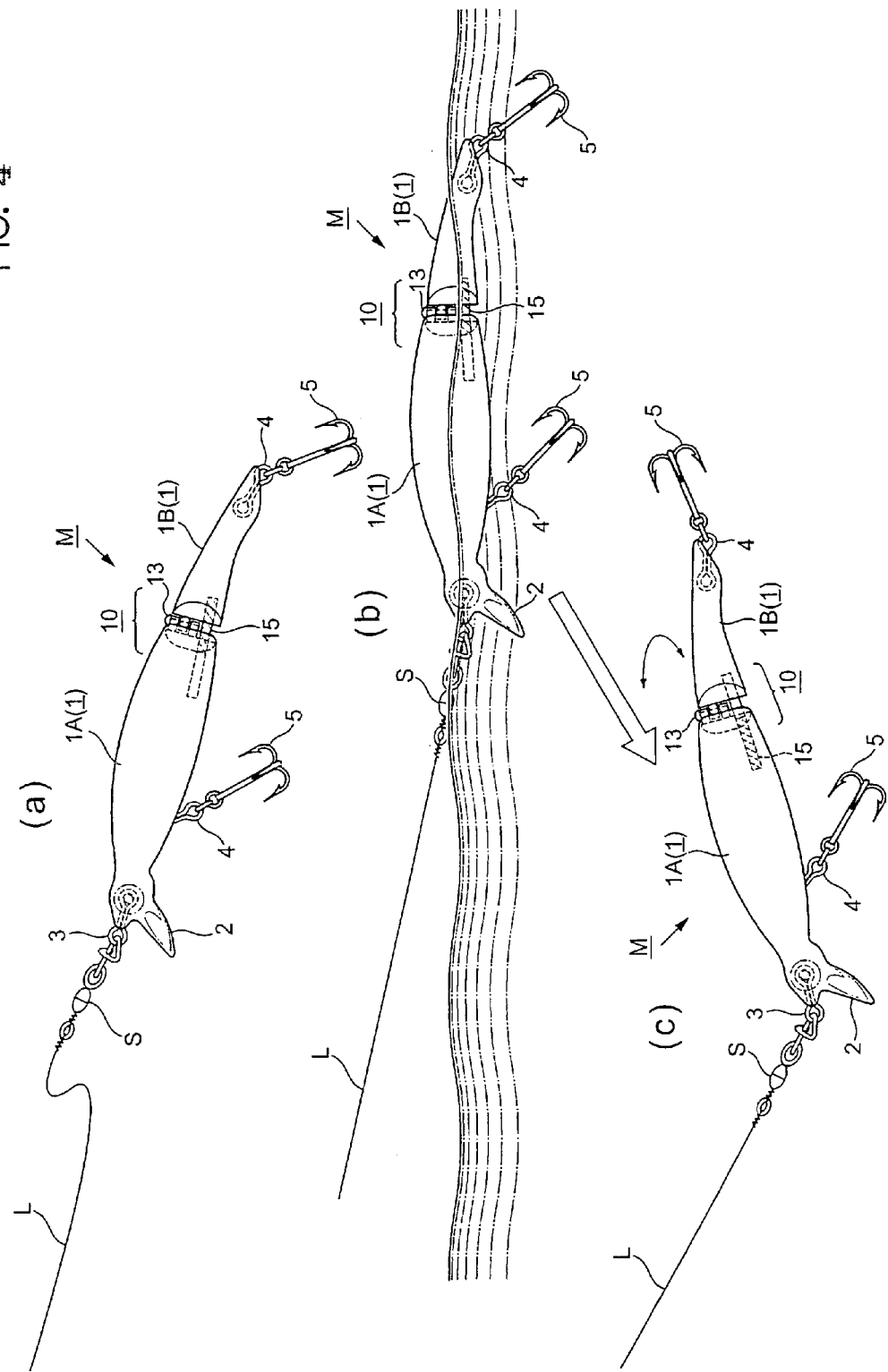
FIGS. 4(a) to 4(c) are side views showing the state of the joint type minnow in air and in water by using bone structures.
Figure 5:
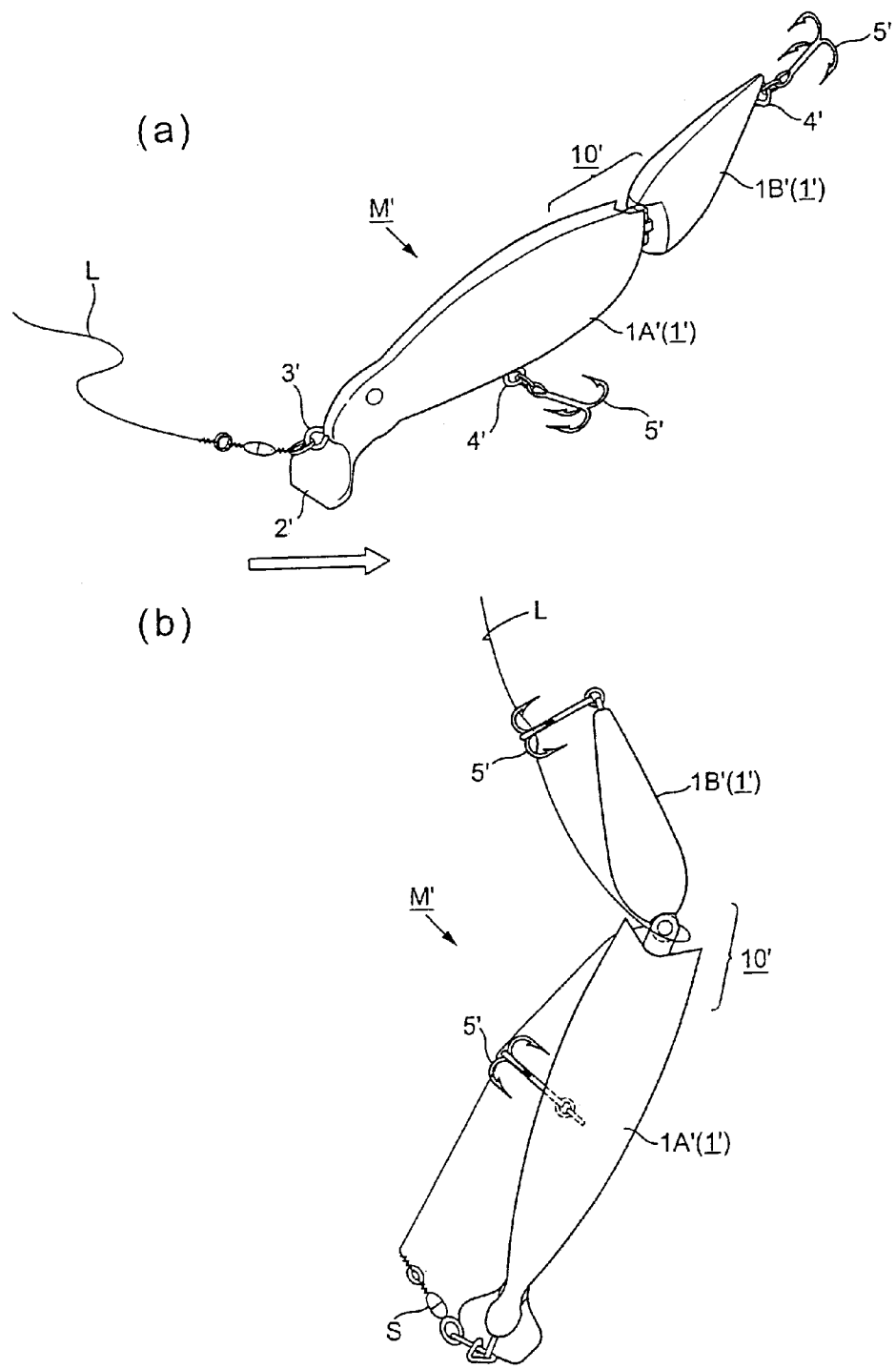
FIGS. 5(a) and 5(b) are side view and plan view showing problems of a conventional joint type minnow.

Subsequently, the angler swings a rod to a point, so that centrifugal force is applied to the joint type minnow M. Therefore, the joint type minnow M flies in air with the tail portion 1B thereof facing in the travel direction as shown in FIG. 4(a). At this time, the fixing stick 15 is located in the stick accommodating portion 11B of the tail portion 1B, and thus the mutual swing motion between the main body portion 1A and the tail portion 1B is regulated. Therefore, the joint type minnow M does not suffer undesirable air resistance unlike the conventional joint type minnow M', and further it can fly till a farther point because the center of gravity thereof is shifted to the forward side in the travel direction.

[State in Water]

Finally, the joint type minnow M lands on the water as shown in FIG. 4(b). Then, when the angler starts retrieval to draw the line L, the joint type minnow M suffers water resistance through the lip 2 thereof and submerges with the head bent forward as shown in FIG. 4(c). At this time, the fixing stick 15 slips into the stick accommodating portion 11A of the main body portion 1A and perfectly accommodated therein, whereby the regulation of the mutual swing motion between the main body portion 1A and the tail portion 1B is released.

Thereafter, the joint type minnow M travels while the body 1 thereof is woven-rolled. At this time, the main body portion 1A and the tail portion 1B swing mutually, and make a motion similar to an actual bait fish, so that it effectively attracts target fishes.

What is claimed is:

1. A joint type minnow comprising:
   a body divided into a main body portion and a tail portion;
   a joining structure swingably joining the main body portion and the tail portion; and
   a fixing stick,
   wherein the main body portion has a first stick accommodating portion, which accommodate an entire length of the fixing stick, the tail portion has a second stick accommodating portion, which accommodate a part of the entire length of the fixing stick, and the fixing stick moves between the first and second stick accommodating portions.

2. The joint type minnow of claim 1, wherein the second stick accommodating portion accommodates one third of the entire length of the fixing stick.

3. The joint type minnow of claim 1, wherein the fixing stick comprises one of iron and lead.

4. The joint type minnow of claim 1, wherein the body comprises resin.

5. The joint type minnow of claim 1, wherein the body comprises balsa.

6. The joint type minnow of claim 1, further comprising at least one hook movably attached to at least one of the main body portion and the tail portion.

7. The joint type minnow of claim 1, wherein the main body portion includes a head portion and the head portion includes a lip portion configured to cause the body to submerge under water.

8. The joint type minnow of claim 1, wherein the joining structure comprises a plurality of receiving holes and a pin inserted in the plurality of receiving holes, fixing stick.

9. The joint type minnow of claim 1, further comprising an annular line eye provided at a head portion of the main body portion, wherein the head portion is on an opposite side of the tail portion.

10. The joint type minnow of claim 1, further comprising at least one annular hook eye provided in at least one of the main body portion and the tail portion.

11. A joint type minnow comprising:
    a body divided into a main body portion and a tail portion;
    joining means for swingably joining the main body portion and the tail portion; and
    a fixing stick;
    wherein the main body portion has a first stick accommodating portion, which accommodates an entire length of the fixing stick, the tail portion has a second stick accommodating portion, which accommodates a part of the entire length of the fixing stick, and the fixing stick moves between the first and second stick accommodating portions.

* * * * *